(12) United States Patent
Singh et al.

(10) Patent No.: US 8,615,767 B2
(45) Date of Patent: *Dec. 24, 2013

(54) USING IR DROP DATA FOR INSTRUCTION THREAD DIRECTION

(75) Inventors: Deepak K. Singh, Apex, NC (US); Francois Ibrahim Atallah, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 320 days.

This patent is subject to a terminal disclaimer.

(21) Appl. No.: 11/671,613

(22) Filed: Feb. 6, 2007

(65) Prior Publication Data

US 2008/0189516 A1 Aug. 7, 2008

(51) Int. Cl.
*G06F 9/46* (2006.01)

(52) U.S. Cl.
USPC .......................... 718/105; 712/220

(58) Field of Classification Search
USPC ............................ 712/220; 714/10
See application file for complete search history.

(56) References Cited

U.S. PATENT DOCUMENTS

| | | | |
|---|---|---|---|
| 4,417,470 A | 11/1983 | McCracken et al. | 374/136 |
| 4,712,087 A | 12/1987 | Traa | |
| 5,029,305 A | 7/1991 | Richardson | |
| 5,375,146 A | 12/1994 | Chalmers | 375/350 |
| 5,451,894 A | 9/1995 | Guo | 327/241 |
| 5,457,719 A | 10/1995 | Guo et al. | 375/373 |
| 5,737,342 A | 4/1998 | Ziperovich | 371/25.1 |
| 5,818,380 A | 10/1998 | Ito | |
| 5,844,826 A | 12/1998 | Nguyen | 364/715.1 |
| 5,852,616 A | 12/1998 | Kubinec | 371/21.1 |
| 5,959,564 A | 9/1999 | Gross, Jr. | |
| 5,990,725 A | 11/1999 | LoCascio | |
| 6,034,631 A | 3/2000 | Gross, Jr. | |
| 6,037,732 A | 3/2000 | Alfano et al. | |
| 6,047,248 A | 4/2000 | Georgiou et al. | |
| 6,058,502 A | 5/2000 | Sakaguchi | 714/811 |
| 6,070,074 A | 5/2000 | Perahia et al. | 455/430 |
| 6,076,157 A | 6/2000 | Borkenhagen et al. | 712/228 |
| 6,111,414 A | 8/2000 | Chatterjee et al. | 324/633 |

(Continued)

FOREIGN PATENT DOCUMENTS

| | | | |
|---|---|---|---|
| CN | 1716161 | 1/2006 | |
| JP | 09-097874 A | 4/1997 | |
| JP | 2006-018758 A | 1/2006 | |
| WO | WO 2006/072106 A2 | 6/2006 | G06F 1/20 |

OTHER PUBLICATIONS

McGowen, "Adaptive Designs for Power and Thermal Optimization", Nov. 2005, pp. 118-121.*

(Continued)

*Primary Examiner* — Andrew Caldwell
*Assistant Examiner* — George Giroux
(74) *Attorney, Agent, or Firm* — Thomas E. Tyson; Ian D. MacKinnon

(57) ABSTRACT

A data processing system having a memory for storing instructions and several central processing units for executing instructions, each central processing unit including an adaptive power supply which provides, among other data, IR (voltage) drop information. Circuitry is provided that receives the IR drop information from the many central processing units, selects a central processing unit which has the lowest IR drop and which is available to execute instructions and dispatches instructions to the selected central processing unit from the memory.

20 Claims, 10 Drawing Sheets

(56) References Cited

U.S. PATENT DOCUMENTS

| | | | |
|---|---|---|---|
| 6,125,334 A | 9/2000 | Hurd | 702/60 |
| 6,141,762 A | 10/2000 | Nicol et al. | 713/300 |
| 6,172,611 B1 | 1/2001 | Hussain | |
| 6,212,544 B1 | 4/2001 | Borkenhagen et al. | 709/103 |
| 6,218,977 B1 | 4/2001 | Friend | |
| 6,351,601 B1 | 2/2002 | Judkins, III | |
| 6,429,796 B1 | 8/2002 | Buckley | |
| 6,481,974 B2 | 11/2002 | Horng et al. | |
| 6,591,210 B1 | 7/2003 | Lorenz | |
| 6,625,635 B1 | 9/2003 | Elnozahy | 709/102 |
| 6,713,996 B2 | 3/2004 | Di Iorio | |
| 6,721,581 B1 | 4/2004 | Subramanian | |
| 6,721,892 B1 | 4/2004 | Osborn | |
| 6,724,214 B2* | 4/2004 | Manna et al. | 324/766 |
| 6,838,917 B2 | 1/2005 | Brass et al. | |
| 6,859,113 B2* | 2/2005 | Giousouf et al. | 331/154 |
| 6,897,673 B2 | 5/2005 | Savage et al. | 324/765 |
| 7,086,058 B2* | 8/2006 | Luick | 718/102 |
| 7,093,109 B1 | 8/2006 | Davis et al. | 712/228 |
| 7,096,140 B2 | 8/2006 | Nozuyama et al. | 702/117 |
| 7,100,061 B2 | 8/2006 | Halepete et al. | 713/322 |
| 7,174,194 B2 | 2/2007 | Chauvel et al. | 455/574 |
| 7,184,936 B1 | 2/2007 | Bhandari | 702/189 |
| 7,211,977 B2 | 5/2007 | Squibb | |
| 7,228,446 B2 | 6/2007 | Jorgenson et al. | 713/300 |
| 7,256,622 B2 | 8/2007 | Dronavalli | |
| 7,282,966 B2 | 10/2007 | Narendra et al. | 327/99 |
| 7,307,439 B2 | 12/2007 | Takamiya et al. | 324/763 |
| 7,321,254 B2 | 1/2008 | Li | |
| 7,330,081 B1* | 2/2008 | Asa et al. | 331/57 |
| 7,330,983 B2* | 2/2008 | Chaparro et al. | 713/300 |
| 7,429,129 B2 | 9/2008 | St. Pierre | |
| 7,437,581 B2 | 10/2008 | Grochowski et al. | |
| 7,696,917 B2 | 4/2010 | Matsuura | |
| 7,734,939 B2* | 6/2010 | Kolinummi et al. | 713/320 |
| 2002/0046399 A1 | 4/2002 | Debling | 717/138 |
| 2002/0065049 A1* | 5/2002 | Chauvel et al. | 455/66 |
| 2003/0030483 A1 | 2/2003 | Seki et al. | 327/540 |
| 2003/0057986 A1 | 3/2003 | Amick | |
| 2003/0067334 A1 | 4/2003 | Brass et al. | |
| 2003/0079150 A1 | 4/2003 | Smith et al. | |
| 2003/0126476 A1 | 7/2003 | Greene et al. | 713/300 |
| 2003/0184399 A1 | 10/2003 | Lanoue et al. | 331/176 |
| 2004/0023688 A1 | 2/2004 | Bazarjani et al. | 455/557 |
| 2004/0025061 A1 | 2/2004 | Lawrence | |
| 2004/0090216 A1 | 5/2004 | Carballo et al. | 323/234 |
| 2004/0183613 A1* | 9/2004 | Kurd et al. | 331/186 |
| 2004/0268280 A1 | 12/2004 | Eleyan et al. | 716/6 |
| 2005/0114056 A1* | 5/2005 | Patel et al. | 702/75 |
| 2005/0116733 A1 | 6/2005 | Barr et al. | 324/763 |
| 2005/0134394 A1* | 6/2005 | Liu | 331/57 |
| 2005/0174102 A1 | 8/2005 | Saraswat et al. | 324/102 |
| 2005/0178133 A1 | 8/2005 | Henry et al. | |
| 2005/0209740 A1 | 9/2005 | Vann, Jr. | |
| 2005/0273290 A1* | 12/2005 | Asano et al. | 702/117 |
| 2005/0278520 A1 | 12/2005 | Hirai et al. | 713/1 |
| 2005/0289367 A1* | 12/2005 | Clark et al. | 713/300 |
| 2006/0066376 A1 | 3/2006 | Narendra | |
| 2006/0149974 A1 | 7/2006 | Rotem et al. | 713/300 |
| 2006/0197697 A1 | 9/2006 | Nagata | 342/22 |
| 2006/0247873 A1 | 11/2006 | Fung et al. | 702/64 |
| 2006/0263913 A1 | 11/2006 | Marshall | |
| 2007/0006007 A1 | 1/2007 | Woodbridge et al. | |
| 2007/0074216 A1 | 3/2007 | Adachi et al. | 718/102 |
| 2007/0192650 A1 | 8/2007 | Shiota | |
| 2007/0260895 A1 | 11/2007 | Aguilar et al. | 713/300 |
| 2008/0004755 A1 | 1/2008 | Dunstan et al. | |
| 2008/0071493 A1 | 3/2008 | Wang | |
| 2008/0136400 A1 | 6/2008 | Chi et al. | |

OTHER PUBLICATIONS

Gupta and Rincon-Mora, "Predicting the Effects of Error Sources in Bandgap Reference Circuits and Evaluating Their Design Implications" IEEE's Midwest Symposium on Circuits and Systems (MWSCAS), vol. 3, pp. 575-578, Tulsa, Oklahoma, 2002.

http://en.wikipedia.org/wiki/Bandgap_voltage_reference.

PCT International Search Report, mailed Feb. 5, 2008, for PCT application EP2008/050919, 3 pages.

Schweber, A/D and D/A Converters: Critical links that just keep getting better, Apr. 1989, 4 pages.

PCT International Search Report, mailed oJun. 16, 2008, for PCT application EP2008/050922, 4 pages.

Moore, B.D.; "Tradeoffs in Selecting IC Temperature Sensors"; 1999; Elsevier Science; pp. 181-184.

Sasaki et al.; "−1/+0.8 C Error, Accurate Temperature Sensor using 90nm IV CMOS for On-Line Termal Monitoring of VLSI circuits"; 2006; IEEE; pp. 9-12.

* cited by examiner

USING IR DROP DATA FOR INSTRUCTION THREAD DIRECTION

RELATED APPLICATIONS

This application is related to the following co-pending U.S. Patent Applications filed on the same day as the present application and having the same assignee: "On-Chip Adaptive Voltage Compensation," (U.S. patent application Ser. No. 11/671,485); "Using Temperature Data for Instruction Thread Direction," (U.S. patent application Ser. No. 11/671,640); "Using Performance Data for Instruction Thread Direction," (U.S. patent application Ser. No. 11/671,627); "Integrated Circuit Failure Prediction," (U.S. patent application Ser. No. 11/671,599); "Instruction Dependent Dynamic Voltage Compensation," (U.S. patent application Ser. No. 11/671,579); "Temperature Dependent Voltage Source Compensation," (U.S. patent application Ser. No. 11/671,568); "Fan Speed Control from Adaptive Voltage Supply," (U.S. patent application Ser. No. 11/671,555); and "Digital Adaptive Voltage Supply," (U.S. patent application Ser. No. 11/671,531); each assigned to the IBM Corporation and herein incorporated by reference.

BACKGROUND OF THE INVENTION

1. Technical Field

The present invention relates in general to a system and method for instruction thread distribution. In particular, the present invention relates to a system and method for directing instruction thread distribution according to the measured IR (voltage) drop data of the circuitry to execute the instructions.

2. Description of the Related Art

Many modern data processing systems include multiple central processing unit cores in the system. These data processing systems will execute instructions of a single program across these multiple central processing unit cores. The single program includes many instructions to be executed in the central processing units. One technique to employ the multiple central processing unit cores in the execution of these instructions is to divide the instructions into groups of instructions or threads. Then each thread is directed to a central processing unit for execution. Several prior art patents address the use of instruction threads in a processor and the control of execution of these instruction threads. These patents include U.S. Pat. No. 7,093,109 entitled "Network Processor which makes Thread Execution Control Decisions Based on Latency Event Lengths"; U.S. Pat. No. 6,076,157 entitled "Method and Apparatus to Force a Thread Switch in a Multithreaded Processor"; U.S. Pat. No. 6,212,544 entitled "Altering Thread Priorities in a Multithreaded Processor"; and U.S. Pat. No. 6,625,637 entitled "Deterministic and Preemptive Thread Scheduling and Its Use in the Debugging Multithreaded Applications."

In a multiple central processing unit data processing system, it is helpful to know the physical conditions of the central processing unit cores that will be receiving the instruction threads. To obtain the maximum performance within the data processing system, distribution of the instruction threads for execution should be made to the central processing units that are able to execute these instruction threads efficiently. One physical condition of the central processing unit cores is measured IR drop within the core circuitry. IR drop is defined as average current times the resistance of the power distribution network in a chip. It is a voltage drop across the power distribution network. Therefore, IR drop varies directly as average current or resistance of the power distribution network varies. The average current is a function of the switching activity, frequency and the applied power supply voltage. The power distribution network resistance varies directly with temperature. The higher the measured core IR drop, the less efficient the central processing unit will be.

SUMMARY

In accordance with the present invention, a method for dispatching instructions in a data processing system having multiple central processing units where each central processing unit provides IR drop data, the method including the steps of receiving the measured IR drop data from the central processing units, selecting a central processing unit according to the received IR drop data, and dispatching instructions from memory to the selected central processing unit.

In one embodiment of the present invention, a data processing system is provided, that includes several central processing unit cores, a memory including program instructions for execution by a central processing unit, a selection circuit connected to receive IR drop data provided by the central processing units, and selecting a central processing unit according to the IR drop data received, and an instruction dispatch a circuit connected to the memory and the central processing units to the selected central processing unit.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
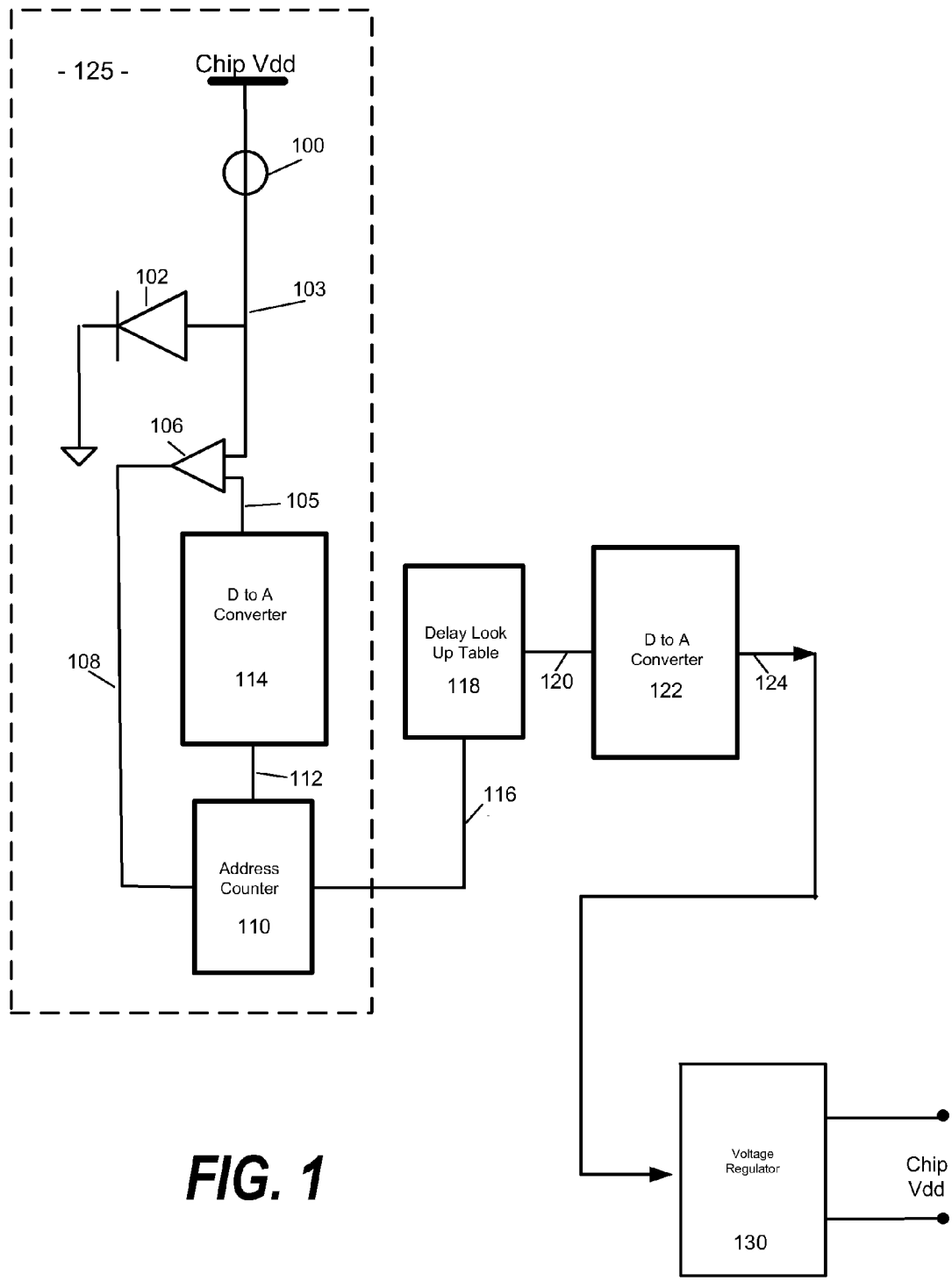
FIG. 1 is a schematic diagram of a simple embodiment of the temperature measurement circuit.

The following is intended to provide a detailed description of an example of the invention and should not be taken to be limiting of the invention itself. Rather, any number of variations may fall within the scope of the invention, which is defined in the claims following the description.

The present invention provides a system to measure temperature within a single central processing unit. This is actually accomplished by providing an adaptive power supply (APS) for each central processing unit. Each of these adaptive power supplies determines operating conditions on an integrated circuit and adjust voltage (Vdd) provided to the integrated circuit to either increase performance of the integrated circuit or save power expended by the integrated circuit.

In a preferred embodiment of these adaptive power supplies, three physical condition measurements are made. The first is temperature, which is measured by a thermal diode on the surface of the integrated circuit. The second is the IR (voltage) drop measured by two ring oscillator circuits and the third is the frequency performance of the integrated circuit measured by a single loop oscillator compared to stored predetermined performance values.

The complete control signal provided to the voltage regulation circuit is:

Total Vdd scaling=Frequency response scaling+Temperature related Vdd scaling+IR drop related scaling All of the measurement circuits are contained on the surface of this integrated circuit device in the preferred embodiment. These measurements are then used to scale an input control signal to a voltage regulation circuit also contained on the surface of the integrated circuit device or alternatively on another integrated circuit. The output of this voltage regulation device provides the integrated circuit operating voltage (Vdd). Thus the voltage supplied to the integrated circuit can be adjusted to either save power or increase performance dynamically during the operation of the chip by under program control. Further the integrated circuit voltage and, therefore, performance can be changed in anticipation of operating environment changes such as a sleep state or the execution of instructions requiring high circuit performance.

This is a dynamic method of varying voltage that takes into account the specifics of the semiconductor manufacturing process, temperature and IR drop effects simultaneously. This method uses available on-chip data to compute adjustment in voltage necessary to either meet target performance or decrease power consumption. The two goals are met using the same circuit. Another advantage of using this method is the flexibility it offers to the users in terms of programmability. On chip voltage can be artificially varied by writing into special registers which provide values used by the power management circuitry to provide the supply voltage Vdd. This feature can be helpful when expecting instructions that require high circuit performance, essentially providing an "on-Demand" performance capability. In other words, to provide on request, additional circuit supply voltage to increase circuit performance.

This method is not limited to a specific technology or type of circuit. It can be applied to a broad type of integrated circuits, especially those that need to deliver higher performance at lower power consumption.

This method also offers reduction in test time for identifying yield and voltage per module. It is a dynamic solution unlike previous static solutions (fuses, etc) that takes into account effects of IR drop.

FIG. 1 is a schematic diagram of one embodiment of the thermal measurement circuit 125 shown connected to the voltage regulation circuit which provides the integrated circuit voltage source (Chip Vdd). This measurement circuit includes a current source 100 connected to the voltage source. This current source 100 is also connected by a line 103 to a thermal diode 102 also connected to ground. The voltage across the thermal diode 102 indicates the measured temperature of this integrated circuit. This thermal voltage signal is provided over line 103 to an analog comparator 106. The output of the comparator 106 is connected to an address counter 110 providing an address to a digital to analog (D to A) converter 114. The operating range for a thermal diode is commonly zero to 125° C. The address counter 110 includes a look up table with 128 entries. These entries correspond to 0 to 127 degrees C. Initially, the address counter 110 starts at zero degrees and increments upward each clock cycle. Each address is provided to the D to A converter 114 over line 112. In operation, the analog comparator 106 compares the output of the D to A converter 114 with the measured thermal voltage provided by the thermal diode 102. When the address counter 110 provides an output representing the same temperature as the thermal diode 102, the output voltage from the D to A converter 110 will be the same voltage as that provided by the thermal diode 102. The output of the analog comparator 106 will then be zero. The address counter 110 will then stop incrementing and provide a signal over line 116 to a delay lookup table (LUT) circuit 118. This value on line 116 is a digital signal representing the temperature measured by the thermal diode 102. This thermal voltage value is used to address a corresponding delay value in the delay lookup table circuit 118. The delay lookup table in circuit 118 is a table of delay pulse width values computed by a simulation of the performance of the integrated circuit. Each value represents the expected delay value computed for the temperature range of 0 to 127 degrees C. for expected integrated circuit performance.

To measure the process on the substrate, a ring oscillator connected to a temperature compensated voltage source (ex: a bandgap reference) is used. In this case, for a given temperature, the pulse width produced by the ring oscillator is a function of the process on the substrate since temperature and voltage are constant. By using a bandgap reference, the voltage applied to a ring oscillator can be kept constant. But the temperature of the substrate depends upon internal and external operating conditions and it cannot be held constant. To eliminate the effects of varying temperature, another scheme is used in this invention.

First, a target predicted circuit performance number (pcpn) is chosen. This number represents the expected circuit performance based on expected semiconductor manufacturing process. This number represents circuit performances expected under nominal applied voltage across the entire operating temperature range. For this pcpn, a simulation of the ring oscillator supplied by a constant voltage from a bandgap reference is carried out for the entire operating temperature range. This simulation yields pulse widths that are generated at a fixed voltage and pcpn values where only the temperature is varied across the entire operating temperature range. If the substrate pcpn is identical to the desired target performance, then the substrate would also yield identical pulse widths for each value of the operating temperature range.

If the substrate pcpn is different than the desired target performance, then the pulse widths produced by the substrate will be either shorter or longer than those produced by simulation depending upon whether the substrate pcpn was faster or slower than the desired target performance. So a comparison has to be made between the pulse width generated by the ring oscillator on the substrate with a simulated value of the pulse wit at the value of the substrate temperature at a fixed voltage. The expected pulse width values at the desired target process for each temperature value within the desired operating temperature range are stored in a Look Up Table (LUT) (for example, 118 in FIG. 1) that is addressed by the current substrate temperature, i.e. based on the substrate temperature, the address pointer points to an entry in the LUT that contains the expected pulse width from the ring oscillator circuit at the desired process corner at a fixed bandgap voltage. For this invention, the operating temperature range is 0° C. to 127° C. and this range is divided into 128 steps of 1° C. each. This requires 128 entries in the LUT, one entry corresponding to each 1° C. rise in temperature.

This resulting pulse width value from the delay lookup table circuit 118 provides a voltage scaling signal in digital form which is converted to an analog voltage signal by D to A converter 122. This scaling voltage signal is provided to a voltage regulator 130 over line 124. The operation result of the circuit 125 would be to increase or decrease the resulting voltage of regulator circuit 130 (chip Vdd) based upon the measured temperature of the integrated circuit measured by thermal diode 102.

Figure 2:
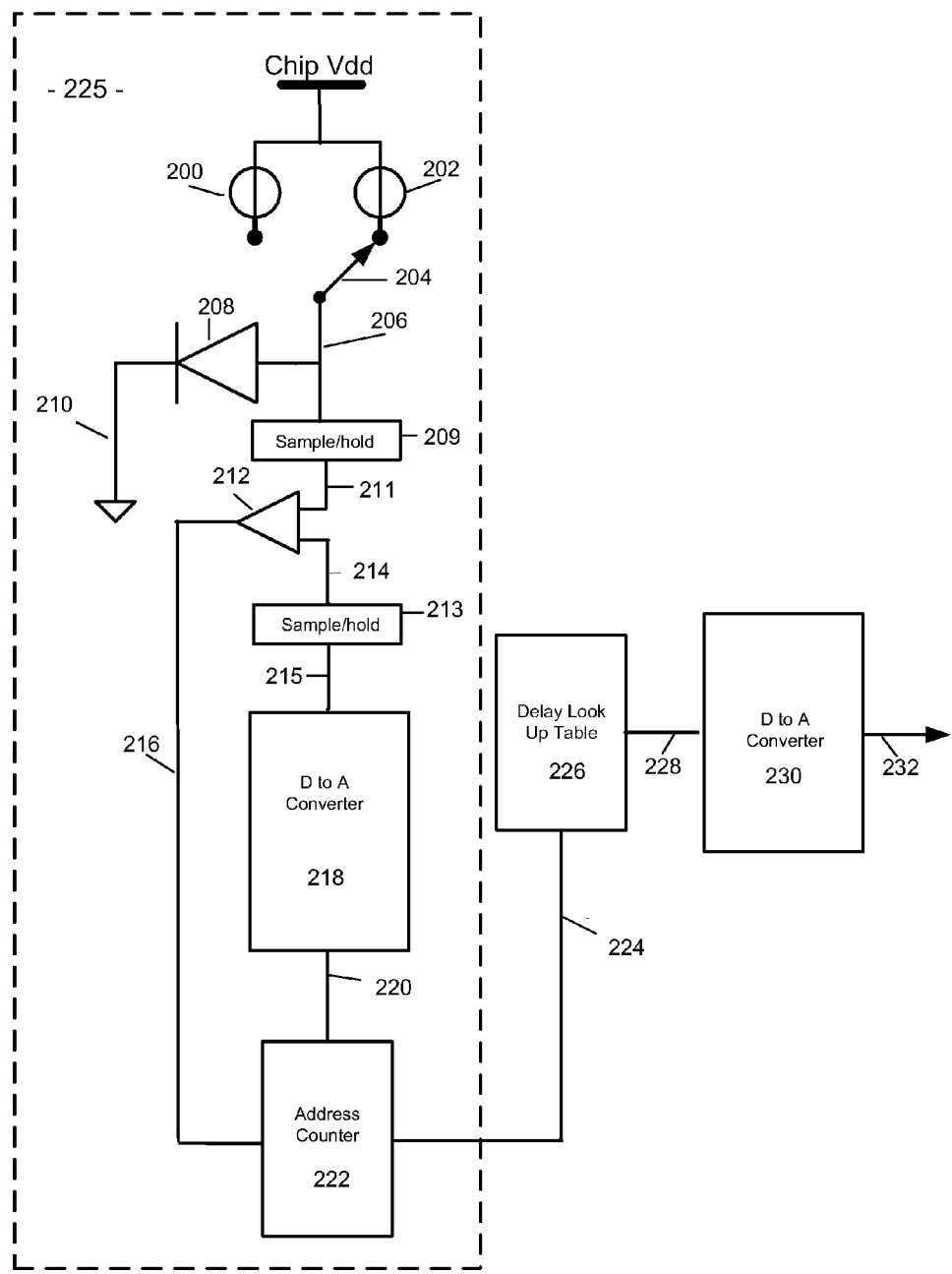
FIG. 2 is a schematic diagram of a second embodiment of the temperature measurement circuit.

FIG. 2 is a second embodiment of the thermal measurement circuit illustrated in FIG. 1. The temperature measurement circuit 225 of FIG. 2 includes two current sources 200 and 202 which are selectively connected to a thermal diode 208 through a switch 204 connected by line 206. The diode is actually made up of a lateral PNP device fabricated in CMOS technology. The collector and base of this device are shorted leaving the diode between base and emitter.

Digital temperature sensors are based on the principle that the base-emitter voltage, $V_{BE}$, of a diode-connected transistor is inversely proportional to its temperature. When operated over temperature, $V_{BE}$ exhibits a negative temperature coefficient of approximately −2 mV/° C. In practice, the absolute value of $V_{BE}$ varies from transistor to transistor. To nullify this variation, the circuit would have to calibrate each individual transistor. A common solution to this problem is to compare the change in $V_{BE}$ of the transistor when two different current values are applied to the emitter of the transistor.

Temperature measurements are made using a diode that is fed by 2 current sources, one at a time. Typically the ratio of these current sources is 10:1. The temperature measurement requires measuring the difference in voltage across the diode produced by applying two current sources.

Line 206 is connected to a "sample and hold" circuit 209 to sample and hold a voltage output of the thermal diode 208. The address counter circuit 222 operates identically to the address counter, circuit 110 of FIG. 1 previously discussed. Address counter circuit 222 increments an address every clock cycle which provides a digital signal representing the temperature range of zero to 127° C. over line 220 to the D to A converter 218 which converts this digital signal representing temperature to a voltage. This voltage signal is provided on line 215 to a second sample and hold circuit 213. Both the sample of the hold circuits 209 and 213 will sample and hold their respective voltages for the comparator 212 so that continuing small variations in temperature from the thermal diode 208 will not adversely affect the operation of this temperature measurement circuit 225. Upon reaching the measured temperature, the comparator 212 will provide a zero output over line 216 to the address counter 222 which provides a digital signal representing the measured temperature on line 224 to the delay lookup table circuit 226. The operation of the delay lookup table circuit 226 providing a digital delay value on line 228 to the D to A converter 230 is the same as previously discussed for the measurement circuitry 125 in FIG. 1.

Figure 3:
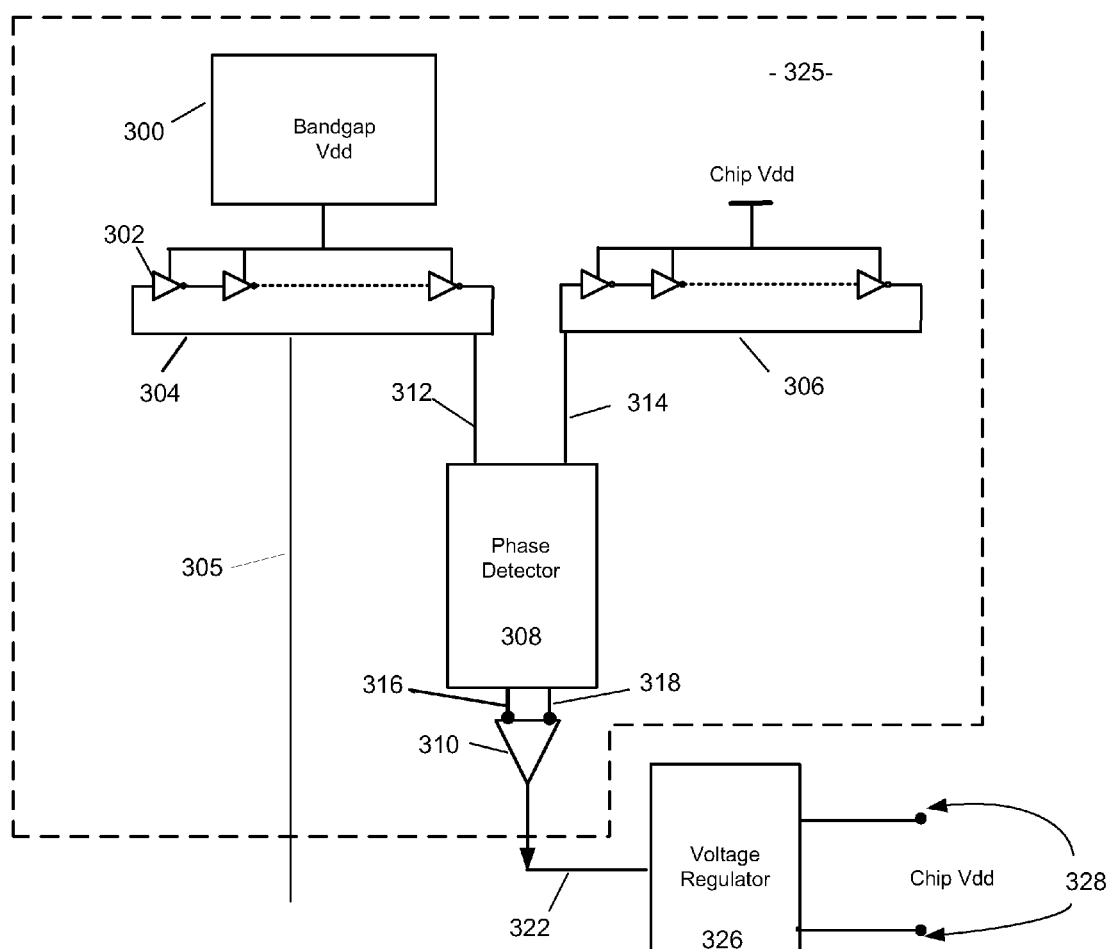
FIG. 3 is a schematic diagram of the two ring oscillator circuit that provides input for the frequency response measurement and provides the IR drop measurement.

FIG. 3 is a schematic diagram of the IR drop measurement circuit 325 which provides voltage scaling signal to a voltage regulator circuit 326. A band gap voltage source 300 is connected to a ring oscillator circuit 304. The ring oscillator circuit 304 consists of an odd number of inverters 302 connected in a loop or ring. The band gap source is obtained from the physical integrated circuit itself and is nominally 1.23 V.

A second ring oscillator circuit 306 connected to the chip voltage source provides an output on line 314. The band gap ring oscillator provides an output on line 312. A phase detector 308 is connected to lines 312 and 314 to determine the difference or delay between the pulses provided by the two ring oscillator circuits 304 and 306. The phase detector 308 provides a voltage magnitude output and a voltage polarity output on lines 316 and 318 respectively which in combination represent the delay difference between the ring oscillator circuits 304 and 306. Lines 316 and 318 are input to a comparator 310 which provides a voltage scaling signal on line 322 to the voltage regulator 326. It should be understood that this voltage scaling signal on line 322 is based solely upon the IR drop of the integrated circuit. Based on the voltage scaling signal of line 322, voltage regulator 326 provides the appropriate chip Vdd value. In the preferred embodiment, the two ring oscillator circuits 304 and 306 should be located in close proximity to each other so that the effects of any irregularities across the surface of the integrated circuit will be minimized.

The frequency response of the integrated circuit (or performance of the integrated circuit) can be measured by using the output of a band gap voltage connected ring oscillator 304 on line 305 of FIG. 3 and the lookup table containing known delay values based on chip temperature from circuit 226 or FIG. 2. This is illustrated in combination with the IR drop measurement of circuit 325 and the temperature measurement of circuit 225 in FIG. 4. In the IR drop measurement circuit 325, the band gap connected ring oscillator 304 provides a second signal connected to an integrator circuit 414, which takes the pulse signal from the band gap connected ring oscillator 304 of circuit 325 and converts it into a voltage which is then provided to difference circuit 416. Another input line 415 to the difference circuit 416 is compared to the delay voltage signal output from the D to A converter 230 representing the expected delay based on the measured temperature. The output of this difference circuit 416 represents a voltage indicative of the integrated circuit frequency response or performance of the integrated circuit. More specifically, this signal provided to multiplexer 418 represents the actual integrated circuit performance compared to the expected integrated circuit performance for that temperature. If the expected delay signal on line 415 is less than the delay signal from integrator circuit 414, the chip is performing below expectations and the voltage Vdd should be increased. Conversely, if the expected delay on line 415 is greater than the delay signal from integrator circuit 414, the chip is performing above expectations and the voltage Vdd could be lowered to save power.

Figure 4:
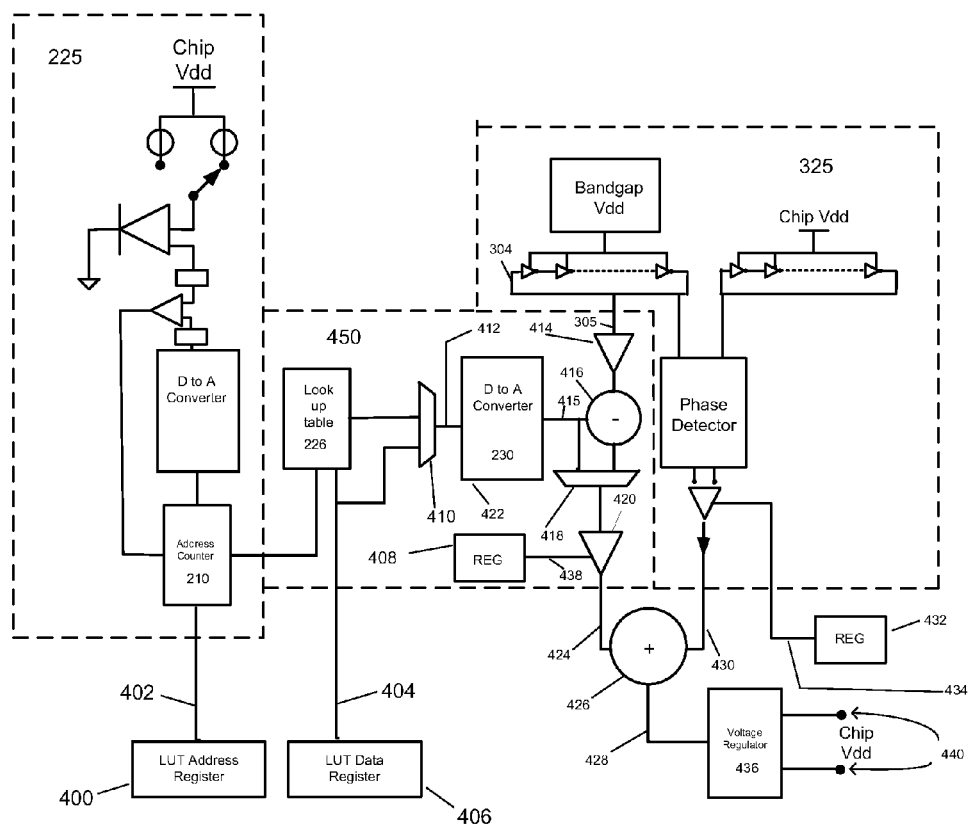
FIG. 4 is a schematic diagram of the preferred embodiment of the adaptive voltage compensation circuit.

FIG. 4 also illustrates the preferred embodiment of the invention combining the temperature measurement circuit 325 output, the IR drop measurement circuit 325 output with the frequency response measurement as discussed above. In this embodiment, the temperature measurement circuit includes a lookup table address register 400 connected to the address counter 210 by line 402 to provide an initial address or to provide an artificially changed temperature that would result in an artificially changed voltage scaling signal. Also, the lookup table data register 406 is provided that may provide a directed input into the delay lookup table 226 shown in block 450 where block 450 also contains other circuit elements for frequency response measurement. This can be used to provide entries into the delay lookup table or provide bypass data output directly to multiplexer 410 which is input to the D to A converter 230. In this manner, a programmer could directly control the delay value, which is used to compute the voltage scaling signal on line 428. The output of the D to A converter 230 is provided on line 415 directly to the difference circuit 416 and to the multiplexer 418. In this manner the multiplexer 418 may bypass the difference circuit 416 and only provide the temperature dependent table delay value to the driver 420. The driver 420 is connected to a register 408 by line 438 which can be used to control the amount of signal output on line 424 to the summing circuit 426. Likewise, in circuit 325, register 432 provides on line 434, a signal that can be used to vary the amount of the scaling signal output from the circuit 325 to the summing circuit 426. The output from summing circuit 426 is the voltage scaling signal on line 428 and is provided to the voltage regulator 436 which in turn provides the integrated circuit voltage (chip Vdd) 440.

Figure 5:
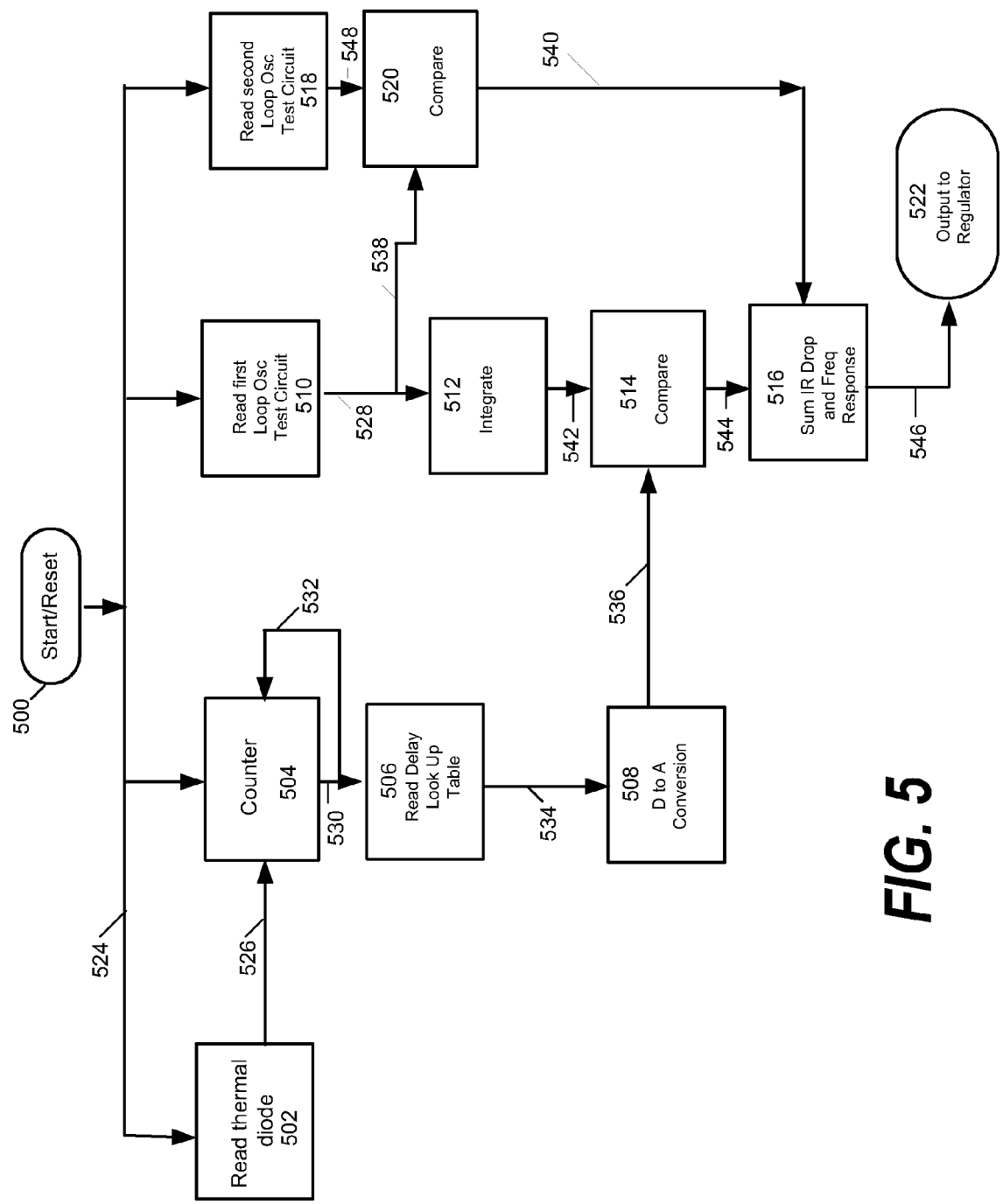
FIG. 5 is a flow chart representing the operation of the adaptive voltage compensation circuit.

FIG. 5 is a process flow chart representing the operation of the invention. It is important understand, that FIG. 5 is not a flow chart representing software execution but of a simultaneous process producing the voltage scaling signal previously discussed in the operation of the different functional units of the present invention. The discussion of this flowchart of FIG. 5 will also reference FIGS. 2, 3 and 4 respectively. In the start phase 500, path 524 illustrates the simultaneous operation of the different aspects of this invention. In step 502, the thermal diode 208 provides an output voltage indicating the measured circuit temperature on line 506 to decision block 504. Decision block 504 represents the operation of the address counter 222, the D to A converter 218 and the voltage comparator 212 (of FIG. 2) in determining a digital signal representative of the circuit temperature as previously discussed. Referring to FIG. 5, this digital temperature is provided on path 530 to the delay lookup table in step 506 which provides a digital signal representative of the delay on path 534 to the D to A conversion step 508 resulting in the delay signal voltage provided to the comparator 514 over path 536.

Returning to path 524, the frequency response value measured in block 510 is provided in path 528 to both the integration block 512 and to the compare block 520 by line 538 as discussed in FIG. 4. The integration circuit 414 of FIG. 4 provides the frequency response measurement signal to the compare block 514 over path 542 which is then compared to the delay signal on path 536. This result of this comparison is provided on path 544. Returning to path 524, the measurement of the IR drop from the ring oscillator 306 connected to the chip voltage supply is compared with the ring oscillator 304 connected to the band gap voltage source in step 520. The output on path 540 represents the IR drop portion of the voltage scaling signal and is combined in step 516 to produce the overall voltage scaling signal 546 provided to the regulator 436 in step 522. It is important understand that this voltage scaling signal results from the combination of the measurements for temperature, IR drop and circuit frequency response.

Digital Implementation of the Adaptive Voltage Supply

Figure 6:
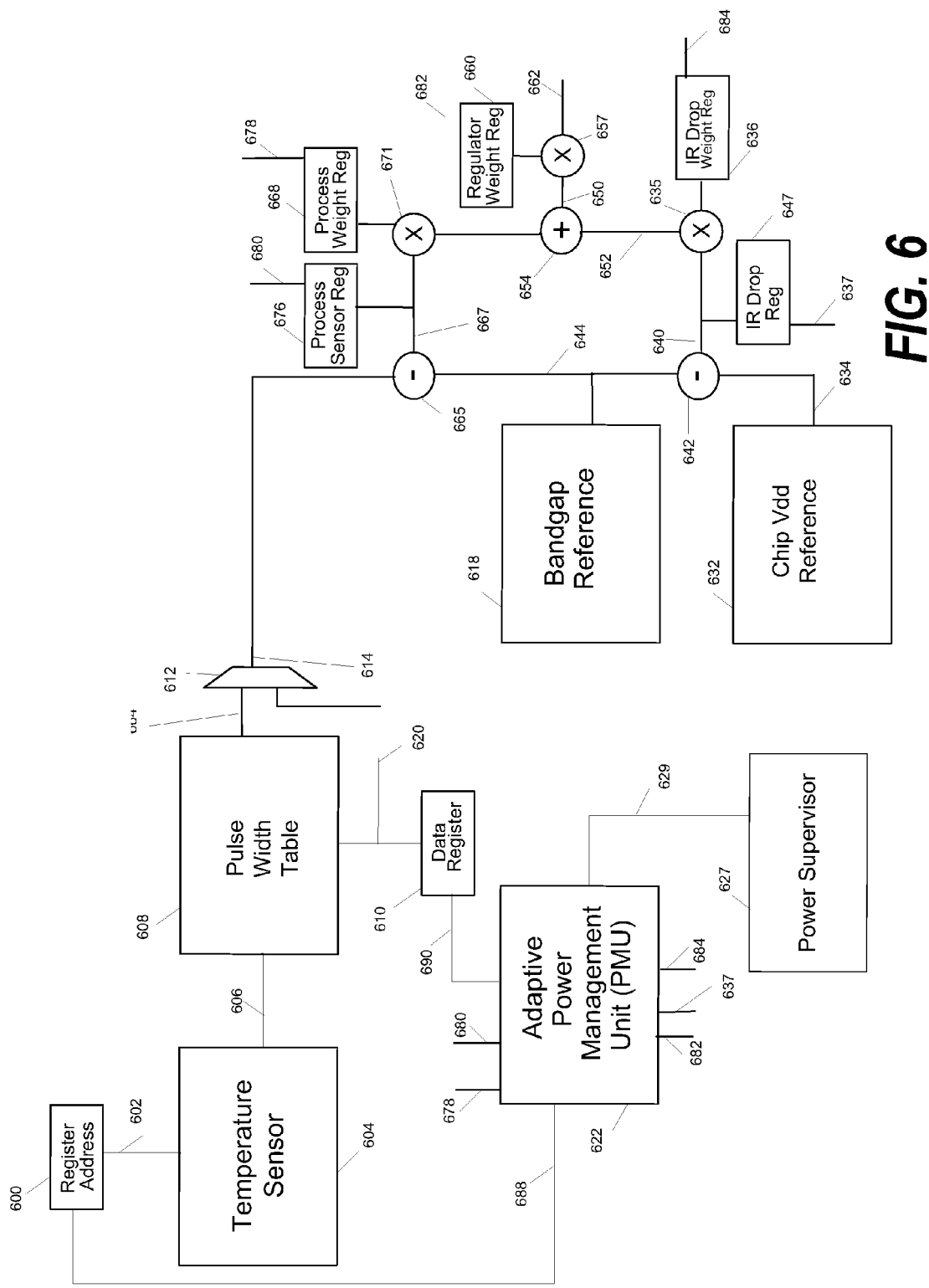
FIG. 6 is a block diagram of a digital implementation of the adaptive voltage compensation circuit.

FIG. 6 is a block diagram of an embodiment of the digital adaptive voltage supply. Block 604 represents the temperature sensor previously discussed in FIGS. 1, 2 and 4. Register 600 provides an address into the temperature sensor tables, as previously discussed. The output of the temperature sensor block 604 on line 606 is provided to the pulse width table 608. This table 608 is also connected by line 622 to a data register 610. The data register 610 provides the ability to input a value into either the pulse width table 608 or to the multiplexer 612. In this manner, the adaptive power management unit 622 may provide inputs into data register 610 which is substituted by a multiplexer 612 for a pulse width value. In other words, a computer program providing control of the operation of the adaptive power management unit 622 can directly control the value in the data register 610 and thus indirectly control the voltage scaling computation from this point in the block diagram.

The bandgap reference circuit 618 and the Vdd reference circuit 632 are similar to those discussed and illustrated as block 325 in FIG. 4. However, the output of the bandgap reference circuit 618 and chip Vdd reference circuit 632 are combined in a difference circuit 642 that provides an output on line 640. The bandgap reference circuit 618 also provides an output that is combined with the output from the multiplexer 612 in the difference circuit 665. This difference circuit 665 provides an output on line 667.

One distinction from the adaptive voltage supply illustrated in FIG. 4 is the inclusion of the process sensor registers 676 connected to line 667 and the IR drop register 647 connected to line 640. Since the data on lines 667 and 640 are digital, these registers 676 and 647 may receive the values on these lines respectively. Alternatively, register 676 can receive an input on line 680 as can register 647 receive an input on line 637. In other words, both these registers are read/write registers. Returning to line 667, its value is input to a multiplier circuit 671 which receives an input from register 668 that provides a weighting value. In this embodiment, a weighting value can be used to increase or decrease the influence of the process number that results from either the difference circuit 665 or the process sensor register 678. Registers 668 receives an input on line 678 from the adaptive power management unit 622. The result of the multiplier circuit 671 is provided to the adding circuit 654. Line 640 also provides an input to a multiplier circuit 635 which receives a weighting value from the IR drop weight register 636. Like the process weight register 668, the IR drop weight register 636 receives an input on line 684 from the adaptive power management unit 622. The output of multiplier 635 is provided to the summing circuit 654 on line 652. The output from the summing circuit 654 is provided on line 650 to another multiplier 657, which is connected to a regulator weight register 660. This register, connected by line 682 to the adaptive power management unit allows program control of output of the scaling signal of the power supply itself. Therefore, by providing a weighting value in the register 660, the output on line 662 of the overall scaling circuitry can be regulated. Also in FIG. 6, there is a power supervisor circuit 627 which represents the interface to the computing system that permits for overall will control over this digital adaptive voltage supply through line 629 to the adaptive power management unit 622. The registers 600, 610, 676, 668, 660, 636, and 647 are read/write registers. Thus, the power supervisor 627 through the adaptive power management unit 622 can exercise total monitoring and regulation over the operation of the digital adaptive voltage supply.

Figure 7:
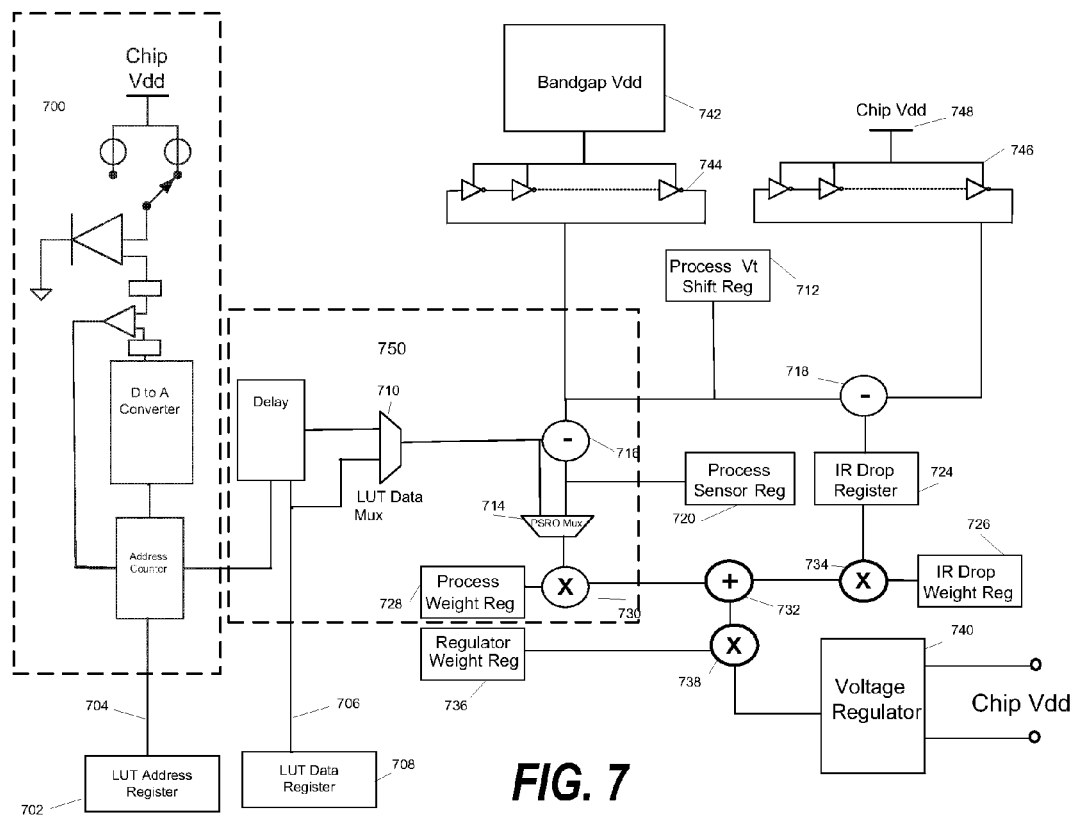
FIG. 7 is a second and more detailed block diagram of the implementation of FIG. 6.

FIG. 7 is a more detailed diagram of the block diagram of FIG. 6 further showing the Process Vt device threshold voltage shift. As the part ages, the Vt for its devices shifts resulting in slower performance. This register 712 connected to the differencing circuit 718 which stores. The Process Vt shift register 712 stores the pulse width value generated by the ring oscillator 744. As the part ages, for the same value of temperature and at bandgap voltage, the value written into this register will become larger indicating that the part is slowing down. By periodically comparing the value stored in this register with a pre-calculated pulse width value (estimated at 80% of the final pulse width achieved at End of Life for the part) for a given temperature, it can be determined when the part has reached the 80% point of its End of Life Vt shift and a signal will be generated that this part may need to be replaced soon. In one embodiment, this register 712 is a read-only register where the value is written into the register based upon user control (i.e. a user can decide when the ring oscillator 744 pulse width data can be written into this register 712, but the user cannot write or overwrite the value of this register 712).

Figure 8:
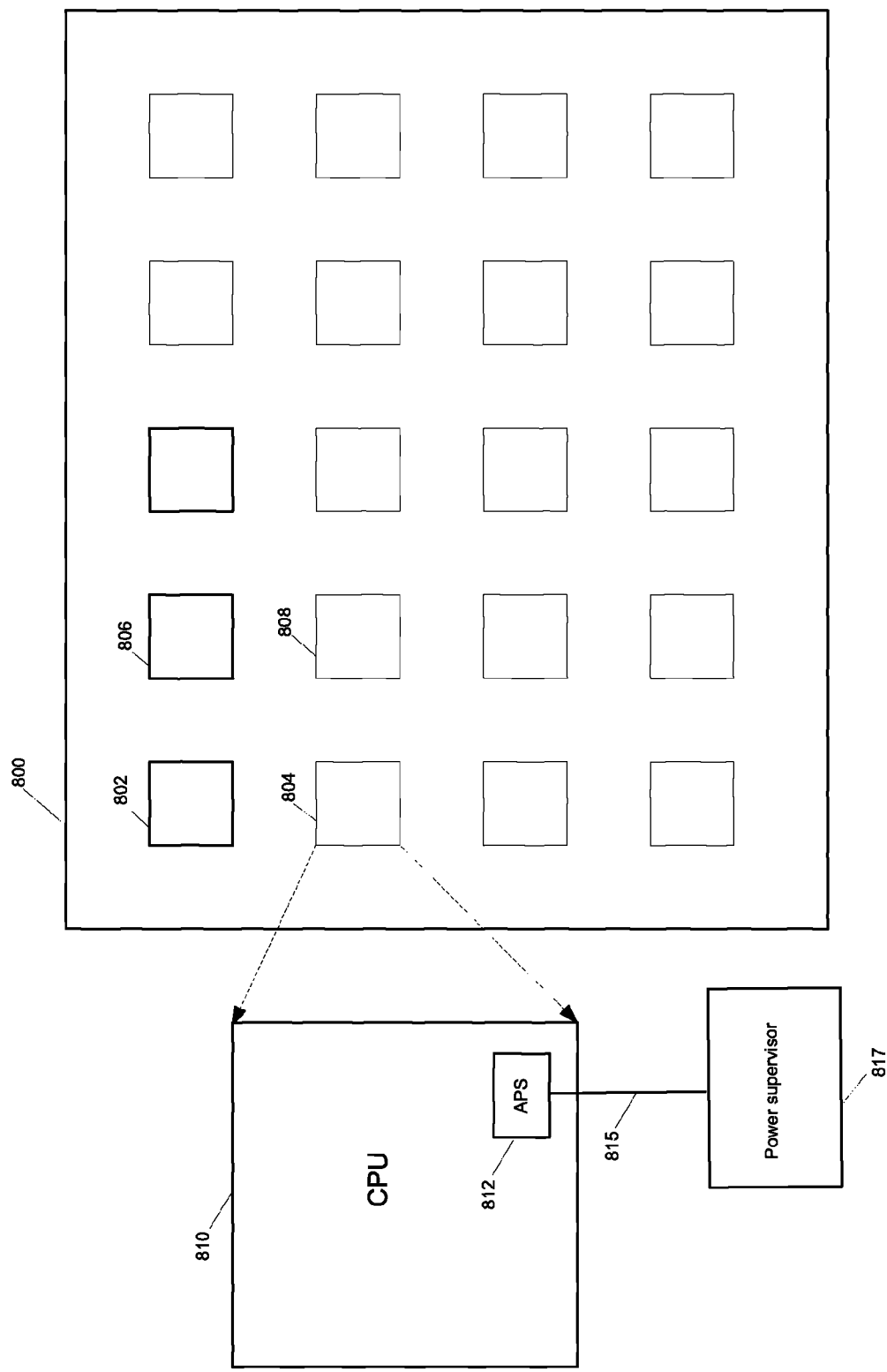
FIG. 8 is an illustration of the location of adaptive voltage compensation circuits on multiple cores.

FIG. 8 is a diagram illustrated embodiment, where multiple CPU cores are located on a single semiconductor substrate 800. Each of the cores 802, 804, 806 and 808 are identical in this illustrated embodiment. However it should be apparent that the functionality of the cores is not relevant to the application of this invention as long as individual adaptive voltage supplies are located in each of the cores. In FIG. 8, the view of CPU core 804 is exploded into a view 810 that includes the CPU itself plus, on the surface of this core, an adaptive voltage supply 812 connected by a line 815 to a power supervisor 817. In operation, the power supervisor 817 represents the programmable control over all of the adaptive voltage supplies on all of the cores in the system. By using the registers discussed in FIGS. 6 and 7, the power supervisor 817 can control and monitor the operation of each adaptive voltage supply.

Figure 9:
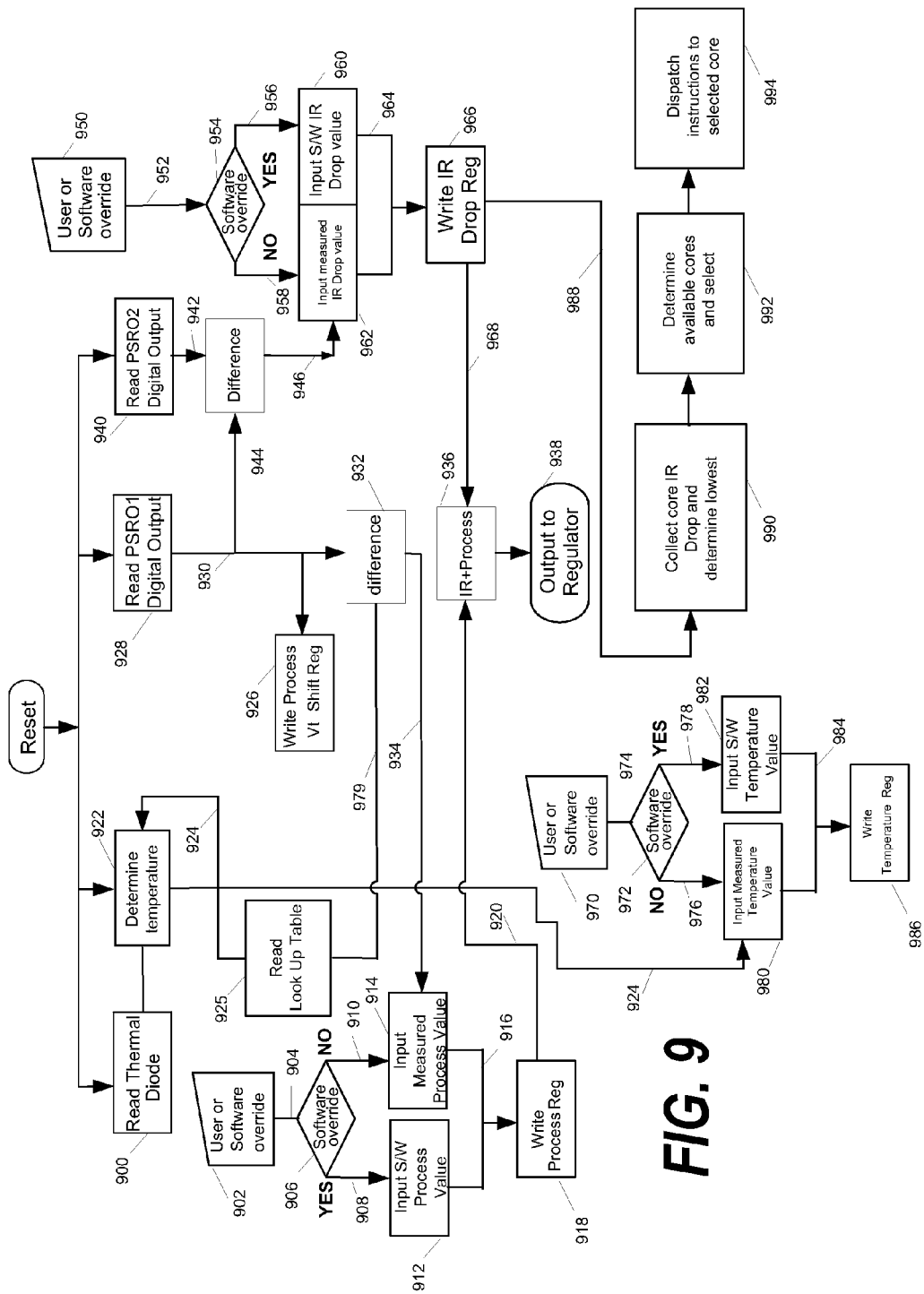
FIG. 9 is flow diagram illustrating IR drop data being obtained and instruction threads being directed accordingly.

FIG. 9 is a flowchart illustrating the operation of the power supervisor in controlling the adaptive voltage supply. The thermal diode voltage is read in step 900 which is connected to the counter 922 that incrementally addresses the lookup table in step 925 to determine the measured temperature value which is provided to the differencing block 932 by line 979 which is also connected to the measured value register 980. Simultaneously, the first process sensing ring oscillator is read in block 928. This frequency with value is provided on line 932 to the write process shift register 926 and a difference circuit 932. Also simultaneously, the second process sensor ring oscillator circuit is read in block 940. Its output is provided of line 942 to the difference circuit 944 where the difference between the first and second ring oscillator circuits is provided on line 946.

FIG. 9 illustrates software control over the adaptive voltage supply previously discussed. Block 950 initiates the software or override capability through decision 954 from line 952. If a software or override is to take place, then the input measured IR drop value in block 962 would not be provided, but rather a software input value in block 960 would be provided over line 964 to the IR drop register 966.

In a similar manner, block 902 controls the process value that is used by the adaptive voltage supply. When a software control is implemented, a signal is provided on line 904 to the decision block 906. If an override by a software input is to take place, then the software input value in block 912 is provided by line 916 to the write process register 918 instead of the measured process of block 914. As shown, the inputted measured process value in block 914 is received via line 934 from the difference circuit 932 at this point. The software controls both the write process register in block 918 and the write IR drop register in block 966. Both the IR drop data and the process data are summed in block 936 to provide the overall voltage scaling signal that is output to the voltage regulator at 938 to provide the Vdd supply voltage to the integrated circuit.

Also in a similar manner, block 970 provides a user or software override in order to provide a substituted temperature value in place of the measured temperature value. This is done by providing a signal on line 974 to a decision process 972 if the software is to override the measured value, a signal is sent online 978, to access the software provided temperature value in block 982, which is written by line 984 into the write temperature register 986. However if there is no software or user override, the decision block 972 provides a signal on line 976 to the register 980 which receives the temperature from line 924 as previously discussed.

It should also be apparent to those skilled in the art that the use of weight registers also provides a greater degree of software control over the operation of the adaptive voltage supply. Therefore by accessing these registers, the power supervisor can both monitor and regulate the operation of each of the adaptive voltage supplies that are contained on the integrated circuit.

When multiple central processing unit cores are contained in the data processing system and each central processing unit core includes its own adaptive power supply, circuitry can be provided to collect data from each of the adaptive power supplies and provide it to supervisory software to enhance the efficient operation of the data processing system. One example is the use of IR drop data obtained from the adaptive power supplies distributed on the central processing units. It has been determined that the central processing units with lower IR drop will execute instructions more efficiently. The IR drop information can be used to select a central processing unit for executing a group of instructions or instructions in a thread. This is illustrated in FIG. 9 by process 990, which is connected by line 988 to the write IR drop register 966 shown. In fact, process 990 is connected to all of the adaptive powers supplies to collect this IR drop data from each of the adaptive power supplies. Once collected the process determines the central processing units with the lowest IR drop. Then in process 992 a determination is made of which central processing unit cores are available for executing instructions. This process 982 then selects the central processing unit that is the lowest IR drop and is available. Then in process 984, the instruction thread or group of instructions is dispatched to the selected central processing unit for execution.

Figure 10:
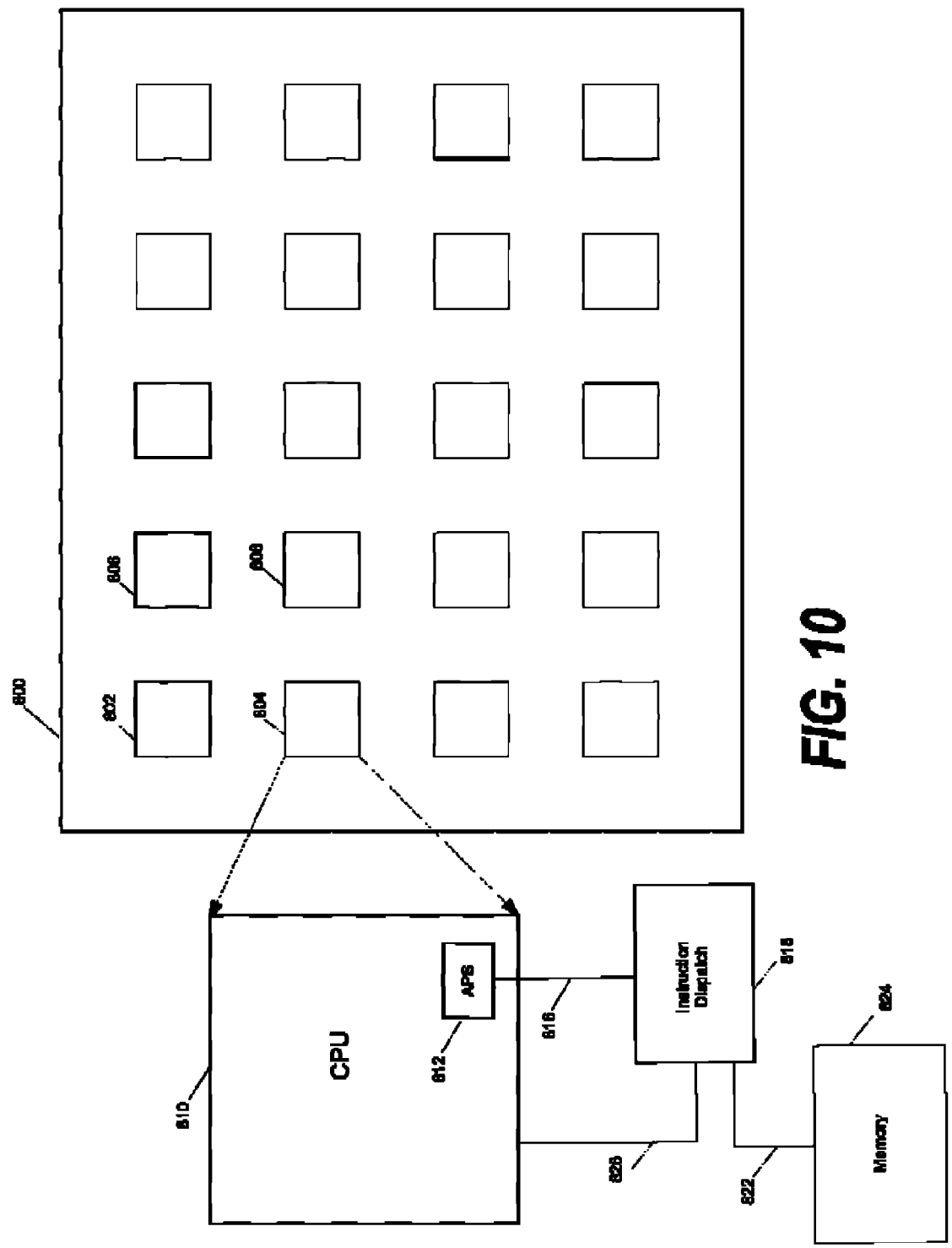
FIG. 10 is a diagram illustrating the instruction distribution process, connected to the program memory, and the multiple central processing units.

While this discussed embodiment shows only a single voltage control circuit on the integrated circuit, it should be apparent that multiple voltage control circuits may be utilized to provide different voltages to different portions of the integrated circuit. This is illustrated in FIG. 10 which is similar to FIG. 8 illustrates multiple central processing unit cores on a single semiconductor substrate 800. In FIG. 10, CPU 810 is the exploded view of the CPU 804 contained on the semiconductor substrate. 800. CPU 810 includes an adaptive power supply 812 that is connected by line 816 to an instruction dispatch process 818. The IR drop data would be provided on line 816 to the instruction dispatch process which examines not only the IR drop of each of the central processing units but also examines whether or not the central processing units are available to receive new instructions for execution. Upon determining the available central processing units available, then the central processing unit with the lowest IR drop is selected to receive instructions for execution. These are instructions are obtained from the memory 824 over line 822, and they are provided to the central processing unit 810 by line 826. In this manner, instructions will be dispatched to the available central processing unit that can most efficiently execute them.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of dispatching instructions in a data processing system having a memory for storing instructions and a plurality of central processing units (CPUs), the method comprising the steps of:
    measuring IR drop of each of the plurality of CPUs from a plurality of IR drop measuring circuits, each IR drop measuring circuit having at least two ring oscillators located in close proximity to each other and providing frequency difference information as IR drop data from a phase difference detection circuit connected to each of the two ring oscillators, and each IR drop measuring circuit located adjacent to a unique one of the CPUs,
    selecting a CPU according to the received IR drop measurement data, and
    dispatching instructions from said memory to the selected CPU.

2. A method according to claim 1, wherein said selecting step includes the step of determining from the received IR drop measurement data which of the plurality of CPUs has the lowest IR drop measurement data and selecting the CPU with the lowest IR drop measurement data.

3. A method according to claim 1, wherein said selecting step includes the step of determining which of the plurality of CPUs is able to receive instructions for execution.

4. A method according to claim 1 wherein said measuring step includes, for each CPU, receiving a first frequency value from a first ring oscillator circuit located adjacent to the CPU and connected to a bandgap voltage source, and receiving a second frequency value from a second ring oscillator circuit located adjacent to the CPU and connected to a CPU voltage source.

5. A method according to claim 4 wherein said measuring step further includes a step of combining a weight value with the first and second frequency values to provide the IR drop measurement data for the CPU.

6. A data processing system comprising:
    a plurality of central processing units (CPUs) where each CPU having an adjacent IR drop measurement circuit including at least two ring oscillators located in close proximity to each other and providing frequency difference information as IR drop measurement data from a phase difference detection circuit connected to each of the two ring oscillators,
    a memory including program instructions for execution by a CPU and connected to said plurality of CPUs,
    a selection circuit connected to the plurality of CPU's to receive IR drop measurement data and providing a signal indicating a selected CPU, and
    an instruction dispatching circuit connected to the memory and the plurality of CPUs and providing instructions to the selected CPU.

7. A data processing system according to claim 6 wherein said selection circuit includes a circuit for receiving the IR drop measurement data from the CPUs and providing the selected CPU signal for the CPU having the lowest IR drop measurement data.

8. A data processing system according to claim 7 wherein said selection circuit includes a circuit to determine which of the plurality of CPUs are idle and is able to receive instructions for execution.

9. A data processing system according to claim 8 wherein each CPU includes a first ring oscillator circuit providing a first frequency value and a second ring oscillator providing a second frequency value and a differencing circuit for combining the first and second frequency values to provide the IR drop measurement data for the CPU.

10. A data processing system according to claim 9 wherein each first ring oscillator circuit for each CPU is connected to a bandgap voltage source.

11. A data processing system according to claim 10 wherein each second ring oscillator circuit for each CPU is connected to a voltage source for the CPU.

12. A data processing system according to claim 11 wherein each differencing circuit is further connected to a weight register having a weight value which is combined by the differencing circuit with the first and second frequency value to provide the IR drop measurement data for the CPU.

13. A computer program product stored in a computer memory, the computer memory containing instructions for execution by a computer, which, when executed by the computer, cause the computer to implement a method of dispatching instructions in a data processing system having a memory for storing instructions and a plurality of central processing units (CPUs), the method comprising the steps of:
    measuring IR drop of each of the plurality of CPUs from a plurality of IR drop measuring circuits, each IR drop measuring circuit having at least two ring oscillators located in close proximity to each other and providing frequency difference information as IR drop data from a phase difference detection circuit connected to each of the two ring oscillators, and each IR drop measuring circuit located adjacent to a unique one of the CPUs,
    selecting a CPU according to the received IR drop measurement data, and
    dispatching instructions from said memory to the selected CPU.

14. The computer program product of claim 13 wherein said selecting step includes the step of determining from the received IR drop measurement data which of the plurality of CPUs has the lowest IR drop measurement data and selecting the CPU with the lowest IR drop measurement data.

15. The computer program product of claim 14 wherein said selecting step includes the step of determining which of the plurality of CPUs is able to receive instructions for execution.

16. The computer program product of claim 15 wherein said measuring step includes, for each CPU, receiving a first frequency value from a first ring oscillator circuit located adjacent to the CPU and connected to a bandgap voltage source, receiving a second frequency value from a second ring oscillator circuit located adjacent to the CPU and connected to a CPU voltage source.

17. The computer program product of claim 16 wherein said measuring step further includes a step of combining a weight value with the first and second frequency values to provide the IR drop measurement data for the CPU.

18. A method according to claim 4 wherein said measuring step further includes periodically storing a value in a Vt register connected to the first ring oscillator indicating end of life for the adjacent CPU.

19. A data processing system according to claim 10 further including a Vt register connected to the first ring oscillator for periodically storing a value indicating end of life for the adjacent CPU.

20. The computer program product of claim 16 wherein said measuring step further includes periodically storing a value in a Vt register connected to the first ring oscillator indicating end of life for the adjacent CPU.

* * * * *